United States Patent [19]

Marazzi

[11] 4,183,885

[45] Jan. 15, 1980

[54] QUICK BAKING PROCESS FOR CERAMIC PRODUCTS

[76] Inventor: Pietro Marazzi, Viale Giacobazzi 1, Sassuolo, Italy, 41049

[21] Appl. No.: 754,039

[22] Filed: Dec. 23, 1976

Related U.S. Application Data

[63] Continuation of Ser. No. 572,939, Apr. 29, 1975, abandoned.

[30] Foreign Application Priority Data

Apr. 29, 1974 [IT]  Italy ................................ 22040 A/74

[51] Int. Cl.$^2$ ........................................... C04B 33/24
[52] U.S. Cl. ........................................ 264/58; 106/45; 264/62; 264/64; 264/66
[58] Field of Search ....................... 264/60, 62, 57, 64, 264/58; 106/45

[56] References Cited

U.S. PATENT DOCUMENTS

| | | | |
|---|---|---|---|
| 2,910,760 | 11/1959 | Jackson | 264/57 |
| 3,651,184 | 3/1972 | Everhart | 264/60 |

FOREIGN PATENT DOCUMENTS

| | | | |
|---|---|---|---|
| 2435502 | 2/1975 | Fed. Rep. of Germany | 106/45 |
| 412456 | 7/1974 | U.S.S.R. | 264/57 |

OTHER PUBLICATIONS

Daner et al., "A Gas Fired Hearth Kiln for Fast Firing High Alumina Substrate".

*Primary Examiner*—R. F. White
*Assistant Examiner*—John A. Parrish
*Attorney, Agent, or Firm*—McGlew and Tuttle

[57] ABSTRACT

A process for the production of tiles made of ceramic material and having substantially planar front and back faces, comprising the steps of advancing a raw tile based on "clay material", with the term having the meaning as set forth in the description, dried and covered on one face with the glaze, which is also dried, in a heat treatment chamber with both faces at least substantially exposed to direct transmission of heat by convection, the tile in the heat treatment chamber going through a first fast heating phase until it reaches a temperature slightly lower than maximum firing temperature, and through a successive firing phase during which it is kept at a range of temperatures between the final heating temperature and the maximum firing temperature, the tile finally being cooled.

13 Claims, 2 Drawing Figures

QUICK BAKING PROCESS FOR CERAMIC PRODUCTS

This is a streamline continuation of application Ser. No. 572,939 filed Apr. 29, 1975, now abandoned.

BACKGROUND OF THE INVENTION

1. FIELD OF THE INVENTION

The object of the present invention is a process for fast firing of ceramic products and particularly of wall-tiles or floor-tiles or other uses.

2. DESCRIPTION OF THE PRIOR ART

The conventional process used for the production of tiles involves a double-firing process wherein the body of the tile, after having been formed by pressing the raw material, or in any other suitable way, is fired as it is and it is subsequently glazed on one of its faces and finally the glaze is fired.

The conventional process, which is used for a wide range of ceramic products, provides products of the desired quality, but it is obviously time consuming and expensive and attempts have been made to replace it with faster and cheaper processes, particularly by the so-called single firing processes in which the ceramic body is coated with the glaze after drying and subsequently the glazed body is fired in a single-phase.

The single-phase firing processes are more critical and difficult than the conventional one and have been carried out more or less successfully according to the raw materials used and the shape and nature of the required product. However, these do not always afford the desired savings, for instance in cases in which the single-firing requires a considerable length of time and produces a poor quality product or a high rate of rejects.

The relative fast single-firing is feasible, as well known in the art, by using certain raw materials, especially batches with a high content, for example 70%, of talcum and wollastonite.

However, such a method of operation is economically advantageous only in some specific areas, like the United States, but not in most areas like Europe, South America and Asia, where, for economic reasons and according to the availability of materials, there is required the use of natural clay bodies or—depending on the areas—of bodies firing with clay, kaolin, calcium or magnesium carbonates, silica and feldspathic materials and other natural components as well as pre-treated or synthetic materials.

SUMMARY OF THE INVENTION

The present invention refers to the production of tiles made from such materials or bodies which will be referred to in the following specification with the term "clay materials", it being understood that materials containing high percentages (50% or more) of talcum and wollastonite, as well as those with the addition of clay as binder, are excluded from the above term.

Such "clay materials" may contain raw clays and or pre-fired clays as a certain percentage, at least about 40% of raw clay, is necessary to confer to the material the desired mechanical properties, and they must not contain, as mentioned above, substantial amounts of talcum and wollastonite. As far as the rest is concerned, they may contain various materials, such as siliceous or feldspathic sand and alkaline-earth, iron compounds and others.

The composition should be preferably such that the sum of magnesium and calcium oxides does not exceed much more than 20% by weight (a percentage of 30%, no doubt, should be excessive) and even better it should not exceed 20%, and that the percentage of aluminum oxide be contained within the same percentages. Even more preferably the composition may contain an amount of iron oxide of a few units percent (less than 10%) by weight.

The object of the present invention is a process for singlefiring of tiles, which enables the production of perfect products in an exceptionally short time, as has never been achieved heretofore, and consequently with substantial savings, made of "clay materials", as specified above, thus obtaining final products of the highest quality, of regular geometric shape and free of defects.

The process according to this invention comprises the steps of advancing a raw tile made of "clay materials"—the term having the meaning as mentioned above—dried and covered on one face with the glazing material, also dried, through a heat treatment chamber, with both front and back planar faces substantially exposed to the direct transmission of heat by convection, the tile passing in the heat treatment chamber through a first phase of fast heating until it reaches a temperature slightly below the maximum firing temperature and through a subsequent firing phase where it is kept at temperatures within the range of the final heating temperature and the maximum firing temperature, the tile being then cooled.

By the term "direct transmission of heat by convection" it is meant that the tile is heated by moving hot gases, with nearly total exclusion, or without determining presence, of other types of heat transmission (such as the conduction from the supporting means on which the tile rests and/or radiation from the walls of the treatment chamber. Obviously, this is accomplished when the hot gases provide the sole heat source within the chamber and therefore they heat the tile as well as the supporting means and the walls (other high temperature bodies being placed into such a position as not to be able to directly contribute to the heating of the tiles).

DETAILED DESCRIPTION OF THE INVENTION

Figure 1:
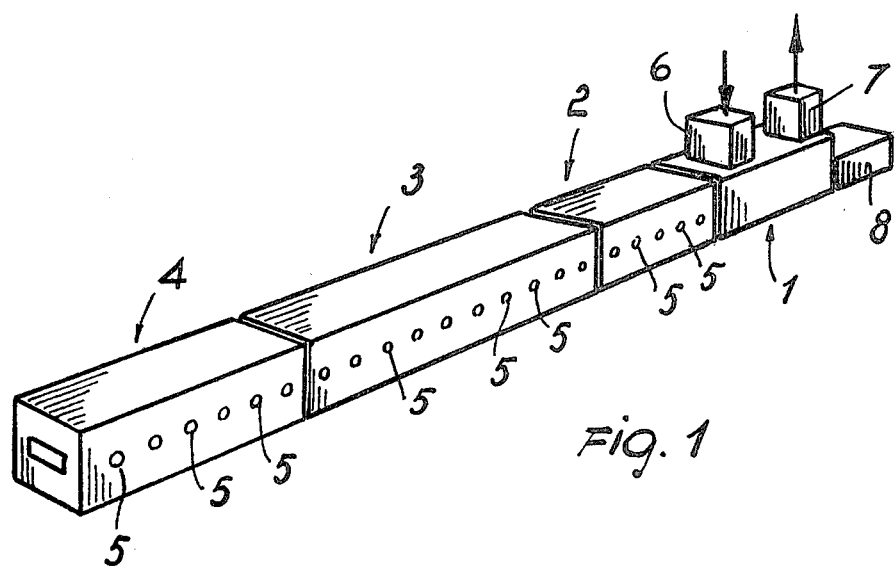
FIG. 1 is a schematic illustration of a tunnel-type furnace running longitudinally on a single plane, for practicing the invention.

Usually, the advancing of the tiles with both faces (which means the glazed face and the rear face, without taking into account the edges which are of relatively negligible surface) substantially exposed to the direct transmission of heat by convection, is obtained by bringing the tiles in successive contact with underlying transporting supports, preferably having a rotating surface and fixed axis, with each of which they come into contact ideally along a generatrix.

The feeding takes place at high speed, considerably higher than the speeds adopted heretofore for materials of this type, at the rate of 1.5-2 meters/minute (these figures not being considered binding), such speeds being optimum for wall-tiles, and therefore 4–5 mm. thick, but may be slightly reduced for thicker tiles.

The heat treatment chamber is temperature-controlled and usually comprises a tunnel-kiln where, in successive areas, the tiles go through the successive steps of heating and being maintained at the firing temperature (or briefly, firing, although proper firing actually starts during the heating step) and are subsequently cooled outside or partially cooled in the treatment chamber.

The drying of the ceramic body is a common operation in the manufacturing of ceramic products and may be usually carried out at a speed differing from that of the above mentioned operation or at the same speed when the dryer is an integral part of the kiln. The same applies to drying of the glazing. In the following description reference is made to a process wherein drying of the tile body is performed previously and separately while drying of the glazing is carried out immediately prior to heating and at the same speed. In this case it lasts a few minutes, for example from 5 to 7 minutes, at suitable temperatures, for example up to 200° C., and under an adequate and intense gas circulation.

When drying of the glazing is completed and the actual heat treatment starts, the temperature of the tiles, according to the present invention, is quickly raised up to the firing temperature. The firing temperature, measured near the tiles—as are all the temperatures stated in this specification—may vary quite substantially according to the compositions, but it is generally around 1000° C., as for example between 800° C. and 1200° C., but, more commonly, between 1000° C. and 1100° C., for example around 1050° C. and 1060° C.

The heating of the tiles is carried out, as referred to above, in an environment where heat transmission takes place by convection with gas flowing counter-current to the direction of travel of the tiles, and besides heating the tiles, it heats also the walls of the heat treatment chamber which are normally made of refractory material and at times may become incandescent, turning into a light-red colour. In these conditions the temperature difference between walls and tiles is always kept at an amount that such heat exchanges by radiation do not have a determining effect.

It is important to dose heating in the heating zone, so as to produce a quick rising of the temperature of the tile, the only upper limit with respect to the rapidity of heating, since the material may be damaged by a too quick evolution of volatile products, by uncontrolled thermal contraction and expansion in the still raw tile and such a limit is set case by case. Generally, a heating time of 4–6 minutes is considered adequate and at this point it may be assumed that the tile has reached—at least on the surface—a temperature a few degrees lower than chamber temperature. This temperature will be referred to as the "firing temperature".

During the actual firing step, the tile remains at a practically constant surface temperature (even if not exactly constant due to the fact that heat-exchanges still continue and the temperature of the chamber is not exactly constant) and continues to advance in the firing zone which is at an almost even temperature tending to be lower at the start and at the end due to closeness to the heating and cooling zones respectively, and with gas flowing counter-current. This step lasts slightly over 10 minutes, for example between 11 and 15 minutes.

In the meantime the heat penetrates more deeply in the tile body, firing the inner layers of the tile. Finally, the cooling step takes place in a time slightly shorter than the firing time, for example slightly shorter than 12 minutes, say 8–10 minutes, and may be determined by a partly directed and partly indirect cooling and occurs partially inside and partially or entirely outside the chamber.

The times specified above by way of example are close to optimum for wall-tiles, 4–5 mm. thick, and may be increased, with a variation ratio generally not linear, for thicker tiles, such as those used for flooring, which may even be 10 mm thick and for which the length of time for heating may be for example up to 6–8 minutes and for firing 17–20 minutes.

It has been found, according to the present invention, that the best compromise between the necessity of suitably supporting the tile on the generatrices of the fixed-axis rotating supports for feeding, and the necessity of not introducing an excessive difference in the thermal conditions of the two faces of the tile, is obtained when the tile is kept in constant contact with two or three of these generatrices.

This is obtained in the more common case of the support by rotating rollers, when the distance between the centers of the rollers is equal to half the length of the tile itself. In such a case it is ensured that the product obtained is of regular geometric shape and free from defects. However, it is possible to modify to a reasonable extent this condition when in practice it is necessary to produce, with the same equipment, tiles of varying dimensions.

According to the present invention, the tile is formed of one of the bodies termed as "clay materials", as specified above. Typical materials forming the bodies are for example: plastic clays; no fat or semi-fat clays; kaolins; feldspars; dolomite and calcium carbonate; siliceous sand. The formulation of the glazing materials varies according to the required product and to the type of support used and may be raw, semi-raw, or fritted glazes.

In the carrying out the present invention there must be considered some physical properties of the material as specified in the following. A temperature/weight diagram of the material indicates a loss of weight with temperature increase according to the development of volatile substances.

With the increase in temperature and with the tile body kept at that temperature for some time, there appears first an increase and next, in the phase of specific interest, a loss of permeability of the tile body itself, which logically starts on the outer surfaces exposed to a quicker increase of temperature. The ceramic material used must have a total weight loss during the entire process, which although not very low when the above materials are dealt with, is however not excessive, for example, not more than 15%. In addition, it must be able to keep substantially its surface permeability at least up to a temperature of 700°–800° C. and until there is no substantial weight loss, as shown in the temperature/weight diagram, obviously under the conditions of the process according to this invention, particularly with the temperature-time gradients contemplated by the invention. Further, the thermo-dilatomeric behaviour of the material, i.e. variation of linear dimensions with increase in temperature, must be such as not to produce excessive difference in dimensions between the two faces of the tile, which due to the unavoidable unevenness in heating may not in fact be at the same temperature at least during some part of the process. Such behaviour of the material may be illustrated by plotting a thermo-dilatometric diagram.

By operating according to the invention, particularly under the preferred and optimum conditions, much better results are obtained, on an industrial scale, with respect to those obtained heretofore and actually beyond expectations. In the ceramic art the attempts made heretofore to introduce single-firing of tiles made of common materials which required a firing time of a few hours and resulted in the production of mostly defective tiles, led to the belief that such results were impossible. The speed increase, the lack of supports for the tile and the drastic reduction of operating times are all factors which, based on past technical experience, were supposed to be negative, so that it was assumed that manufacturing of excellent products from materials of the above mentioned type required operations under gentler, more gradual and mechanically easier condition than those previously adopted and not the contrary.

The fact that, by making all operating conditions simultaneously more severe, i.e. both speed and rapidity and mechanical feeding conditions of the tile, the result obtained was never achieved before even in conditions remotely approaching those of the invention, represents in fact a remarkable technical achievement.

For actuation practice of the invention a tunnel-type furnace running longitudinally on a single plane, as schematically illustrated in FIG. 1, is best suited.

The detailed structure is not shown, as it is not within the scope of the present invention, but generally comprises, assuming that drying of the tile body is carried out separately, a section 1 for drying of the glaze, a section 2 for the heating step, a section 3 for the firing step and a section 4 for the cooling step.

The furnace is conveniently heated by gas burners fitted in the walls so as not to radiate on the tiles, as schematically at 5, or by other suitable means, for example electric heating, the furnace walls being adequately insulated. In the case where gas burners are used, these will produce volumes of combustion by-products which will be conveniently moved counter-current with respect to the tile, travel by means of suitable suction devices (not shown) or other means so that gas masses increase from the outlet to the inlet of the treatment chamber and generally for the major portion of the chamber, usually in a linear manner. In the case of electric heating, air will have to be introduced to provide such volumes.

The elimination of moisture in area 1 may require a separate circulation of hot gas, as shown schematically at 6 (gas inlet) and 7 (outlet), the burners not being provided in this area. Suitable means will be provided to convey hot gases in counter-current flow with respect to the tiles and suitable means will thus be provided for loading and unloading of the tiles, as shown schematically at 8, driving the rollers at the required speeds and for speed control, and so on.

Figure 2:
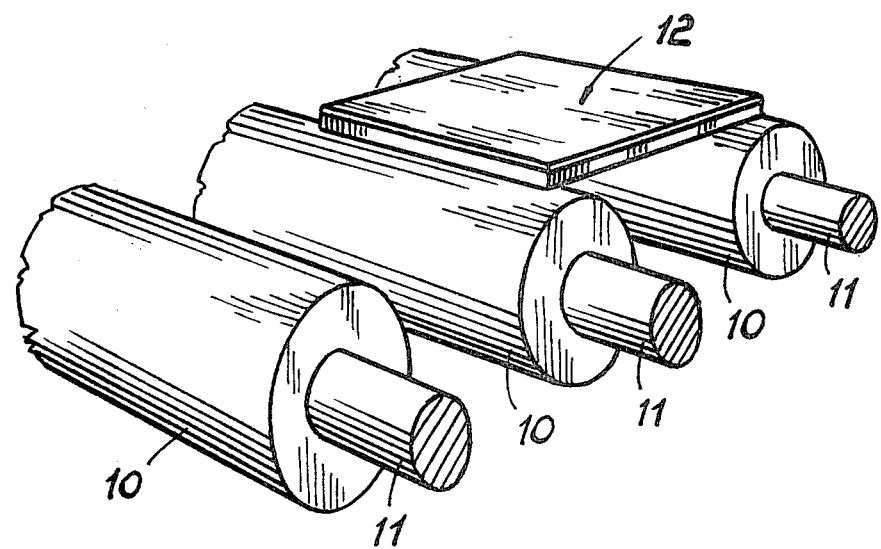
FIG. 2 is a schematic view of a supporting and feeding means for the tiles, i.e. two rollers carried by shafts supporting a moving tile, the roller shafts being controlled by any suitable means outside the furnace.

FIG. 2 shows an example of a supporting and feeding means for the tiles, two rollers 10 carried by shafts 11 supporting a moving tile 12; the roller shafts being controlled by any suitable means outside the furnace.

An example of carrying out the invention, illustrating the production of a particular tile, will now be given by way of example only, since the possibility of varying the compositions based on products available in nature for the industry is practically unlimited and skilled people in the art will be able to practice the invention based on what has hereinbefore been described in the specification without departing from the true scope of the invention even with compositions which are very different.

The initial material is a mixture of "red beds" clays having the following formulation: Ignit.loss 0–15%, $SiO_2$ 55–70%, $Al_2O_3$ 15–20%, $Fe_2O_3$ 2–8%, CaO 1–10%, MgO 1–10%, $K_2O$ 1–6%, and $Na_2O$ 1–5%. The percentages are by weight.

The glaze used has the following composition: frits or glazes made of alkaline-boro-silicates containing Pb, Li, Ti, Ba, Ca, Mg, Sr, Sn, V, Zr: ceramic stains made of oxides or silicates or silico-aluminates of metals such as Fe, Co, Ni, Cr III, Ti, Mn, Cu, Zn, Ba, Zr, Sn, ecc.; various additives for grinding such as kaolins and clays, Zr silicates; sodium-silicate, -chloride and -carbonate.

The tiles are of two main types having dimensions of $150 \times 150 \times 4.5$ and $200 \times 200 \times 9$, respectively.

After pressing, drying and glazing the tiles are fed by means of rollers, as shown in FIG. 2, into an apparatus as illustrated in FIG. 1.

The feeding speed in the first case is 1.9 meters/minute and in the second case 1.4 meters/minute. Drying of the glaze lasts 5 and 6 minutes respectively, at a maximum temperature of 200° C. Heating lasts 5 and 6 minutes respectively. The time required for firing is 13 and 17 minutes respectively and the temperature measured in the chamber near the tiles is 1060° C. Cooling lasts 9 and 12 minutes respectively.

The tiles thus obtained are perfectly regular and meet the required technical specifications.

What is claimed is:

1. A process for the production of ceramic tiles, each having a front face and a rear face, comprising the steps of preparing a raw tile consisting of a dry, unfired tile body with a dried glaze coating on one face of the body, and with the body consisting predominantly of clay and containing more than 40% by weight of raw clay, an aggregate calcium oxide and magnesium oxide content of less than 30% by weight and aluminum oxide content of less than 30% by weight wherein said raw clay is free of amounts of talcum and wollastonite exceeding 50% by weight, and an iron oxide content of less than 10% by weight; advancing the raw tile at a speed of the order of 1.5–2 meters per minute through a heat treatment chamber; in a heating step having a duration of 4–8, minutes, contacting both faces of the tile body concurrently with flowing hot gases as the tile body advances through the treatment chamber to raise both faces concurrently and, by substantially only direct convection heating, substantially to firing surface temperature; in a subsequent firing step having a duration of 11–20 minutes, contacting both faces of the tile body concurrently with the flowing hot gases as the tile body continues to be advanced through the treatment chamber to maintain both surfaces substantially at the firing surface temperature concurrently, by substantially only direct convection heating, to fire the tile body and the glaze of the raw tile; and, following completion of the firing step, finally cooling the fired tile in a cooling step having a duration slightly shorter than that of the firing step; whereby the sum of the duration of the heating and firing steps is not in excess of about 28 minutes and the overall heating, firing, and cooling time is not in excess of 48 minutes.

2. A process as claimed in claim 1, wherein the clay includes calcium and magnesium oxides in a total amount substantially not exceeding 20% by weight.

3. A process as claimed in claim 1, wherein the clay comprises aluminum oxide in an amount substantially not exceeding 20% by weight.

4. A process as claimed in claim 1, wherein the clay includes the following components: $SiO_2$ 55-70%, $Al_2O_3$ 15-20%, $Fe_2O_3$ 2-8%, $CaO$ 1-10%, $MgO$ 1-10%, $K_2O$ 1-6%, and $Na_2O$ 1-5%.

5. A process as claimed in claim 1, wherein the clay has a total weight loss not exceeding 15% under process conditions.

6. A process as claimed in claim 1, in which the heating step has a duration time of about 4-6 minutes and the firing step has a duration time of about 11-15 minutes, for tiles 4-5 mm thick, and, for tiles thicker than 4-5 mm, the heating step and firing step duration times are increased, but to a value less than that proportional to the increased thickness of such tiles thicker than 4-5 mm.

7. A process as claimed in claim 1, wherein one speed of movement of the tiles through the treatment chamber is maintained at 1.5-2 meters/minute, for tiles 4-5 mm thick, and, for tiles thicker than 4-5 mm, the speed of the tiles through the treatment chamber is reduced, but to a magnitude greater than that proportional to the increased thickness of such tiles thicker than 4-5 mm.

8. A process as claimed in claim 1, in which the iron oxide in the dry, unfired tile body is not in excess of 8%.

9. A process as claimed in claim 1, including the step of supporting and advancing each raw tile through the treatment chamber by spaced rotating cylindrical supporting surfaces having a spacing such that each raw tile is continuously supported on at least two, and no more than three, successive cylindrical supporting surfaces while traveling through the treatment chamber.

10. A process as claimed in claim 1, including drying the clay by flowing hot gases immediately prior to heating the raw tile and the glaze in the treatment chamber while advancing the raw tile and the glaze, during such drying, at the same speed as the raw tile and the glaze is later advanced through the treatment chamber.

11. A process as claimed in claim 10, wherein the drying of the glaze lasts about 5-7 minutes.

12. A process as claimed in claim 1, in which firing of the tile is effected at a temperature of 800°-1200° C. as measured in the treatment chamber near the tile.

13. A process as claimed in claim 12, wherein firing of the tile is effected at a temperature of 1,000° C.-1,100° C.

* * * * *